(12) United States Patent
Scaramucci

(10) Patent No.: US 8,490,648 B2
(45) Date of Patent: Jul. 23, 2013

(54) CHECK VALVE

(75) Inventor: John P. Scaramucci, Oklahoma City, OK (US)

(73) Assignee: Valve Innovations, L.L.C., Oklahoma City ( * ) Notice: Subject to any disclaimer, the term of this patent is extended or adjusted under 35 U.S.C. 154(b) by 203 days.

(21) Appl. No.: 13/184,933

(22) Filed: Jul. 18, 2011

(65) Prior Publication Data

US 2013/0020520 A1    Jan. 24, 2013

(51) Int. Cl.
*F16K 15/03* (2006.01)

(52) U.S. Cl.
USPC ............... 137/527.2; 137/527; 137/527.8

(58) Field of Classification Search
USPC ................... 137/527, 527.2, 527.8
See application file for complete search history.

(56) References Cited

U.S. PATENT DOCUMENTS

| | | | | |
|---|---|---|---|---|
| 197,226 | A * | 11/1877 | Rodier | 137/527.2 |
| 325,289 | A * | 9/1885 | Van Wie | 137/527.2 |
| 345,420 | A * | 7/1886 | Eskholme | 137/527.2 |
| 608,450 | A * | 8/1898 | Godfrey | 137/527.2 |
| 2,923,317 | A * | 2/1960 | Mcinerney | 137/527.2 |
| 4,842,014 | A * | 6/1989 | Strelow et al. | 137/527.2 |
| 6,123,528 | A * | 9/2000 | Sun et al. | 137/527 |
| 7,152,622 | B2 * | 12/2006 | Scaramucci et al. | 137/527.2 |
| 8,261,771 | B2 * | 9/2012 | Witkowski et al. | 137/527.2 |
| 2012/0132299 | A1 * | 5/2012 | Cyliax et al. | 137/527 |

* cited by examiner

*Primary Examiner* — John Rivell
(74) *Attorney, Agent, or Firm* — Dunlap Codding, P.C.

(57) ABSTRACT

A top entry check valve including a valve body with an access port and clapper assembly with a compressible hanger positioned in alignment with the access port. The compressible hanger comprises a plate member stamped from a sheet of metal having at least one dimple formed in one of the upper side and the lower side and a corresponding protuberance formed on an opposing side so as to define a compressible area. A clapper is connected to the hanger so that the clapper is movable between a closed position and an open position. A closure member has an abutment surface engaging the hanger so that the hanger body is compressed between the closure member and the valve body.

15 Claims, 4 Drawing Sheets

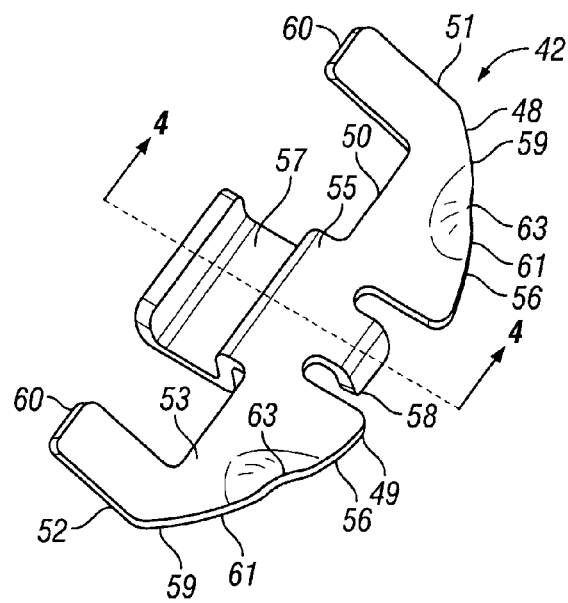
FIG. 3A
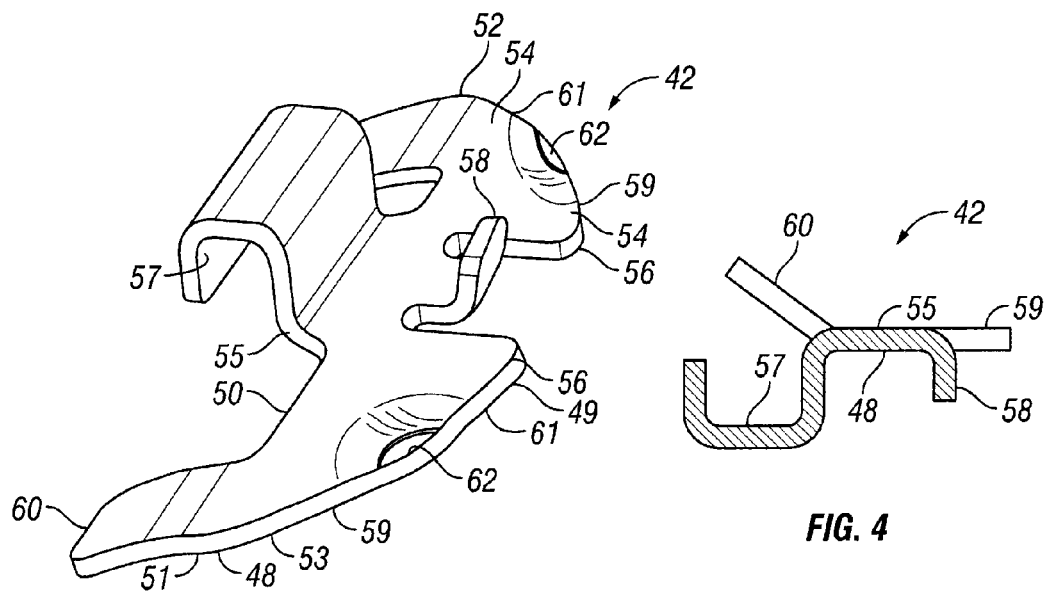
FIG. 3B
FIG. 4

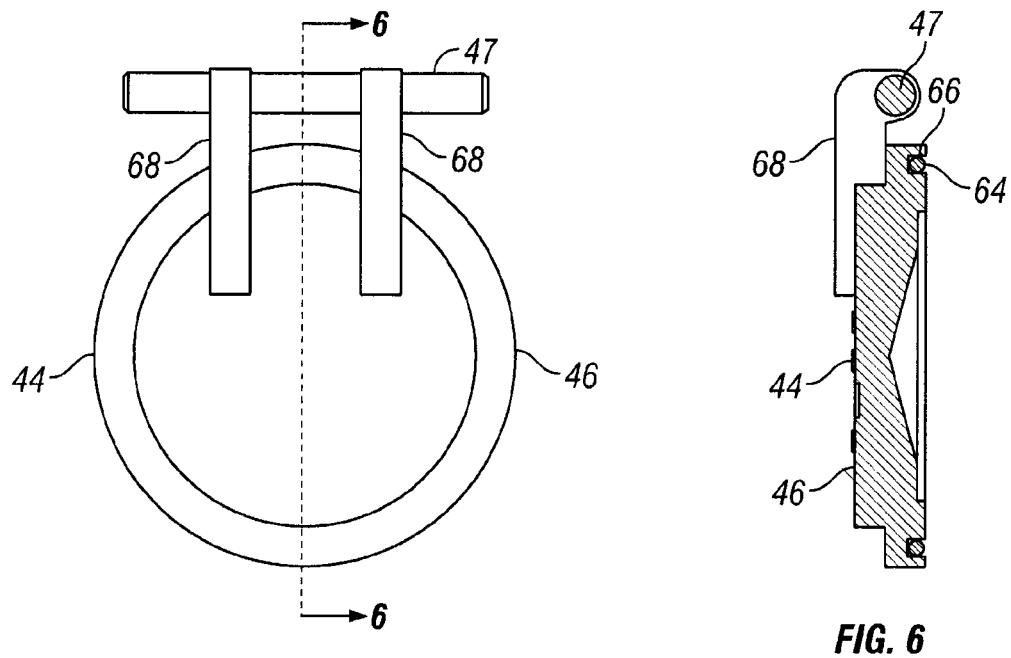
FIG. 5
FIG. 6
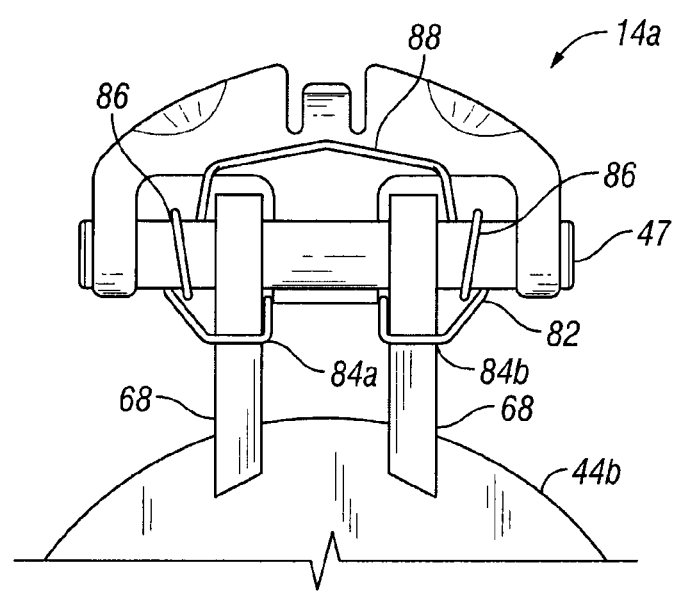
FIG. 7

CHECK VALVE

BACKGROUND OF THE INVENTION

1. Field of the Invention

The inventive concepts disclosed herein relate generally to valves and more particularly, but not by way of limitation, to a check valve constructed to facilitate repair and maintenance of the valve when worn or otherwise damaged.

2. Brief Description of Related Art

Check valves are well known for use in flow lines where it is desirable to permit fluid flow in one direction and preclude fluid flow in the opposite direction. A common structure for achieving one-way flow is by the use of a disk or clapper that is positioned so that it can pivot about an axis of a pivot shaft. The disk is loosely retained in position between a recess formed in the valve body and the lower edge of a bonnet used to close an access port.

In non-corrosive applications, such a structure generally allows for a reasonable service life. In most applications, however, in particular petroleum production, corrosive constituents generally exist within the flow media. Even when the flow media is only mildly corrosive, the combined action of the corrosion and the erosion created by vibration and the rubbing movement of the pivot shaft against the valve body and the bonnet often causes a loss of surrounding metal which may result in failure of the valve due to misalignment of the disk. One solution to this problem would be to make the entire valve from stainless steel or some other corrosion resistant material. While this would solve the corrosion problem, the cost of the valve would greatly increase and would not be economically viable.

To this end, a need exists for a check valve that is capable of being used in a corrosive environment yet is cost effective to manufacture and repair. It is to such an check valve that the present invention is directed.

BRIEF DESCRIPTION OF THE SEVERAL VIEWS OF THE DRAWINGS

FIG. 3A is a top perspective view of a hanger.

FIG. 3B is a bottom perspective view of the hanger of FIG. 3A.

FIG. 4 is a cross sectional view taken along line 4-4 of FIG. 3A.

FIG. 5 is a downstream elevational view of a clapper assembly.

FIG. 6 is a cross sectional view taken along line 6-6 of FIG. 5.

FIG. 7 a rear elevational view of a portion of another embodiment of a clapper assembly.

DETAILED DESCRIPTION OF EXEMPLARY EMBODIMENTS

Figure 1:
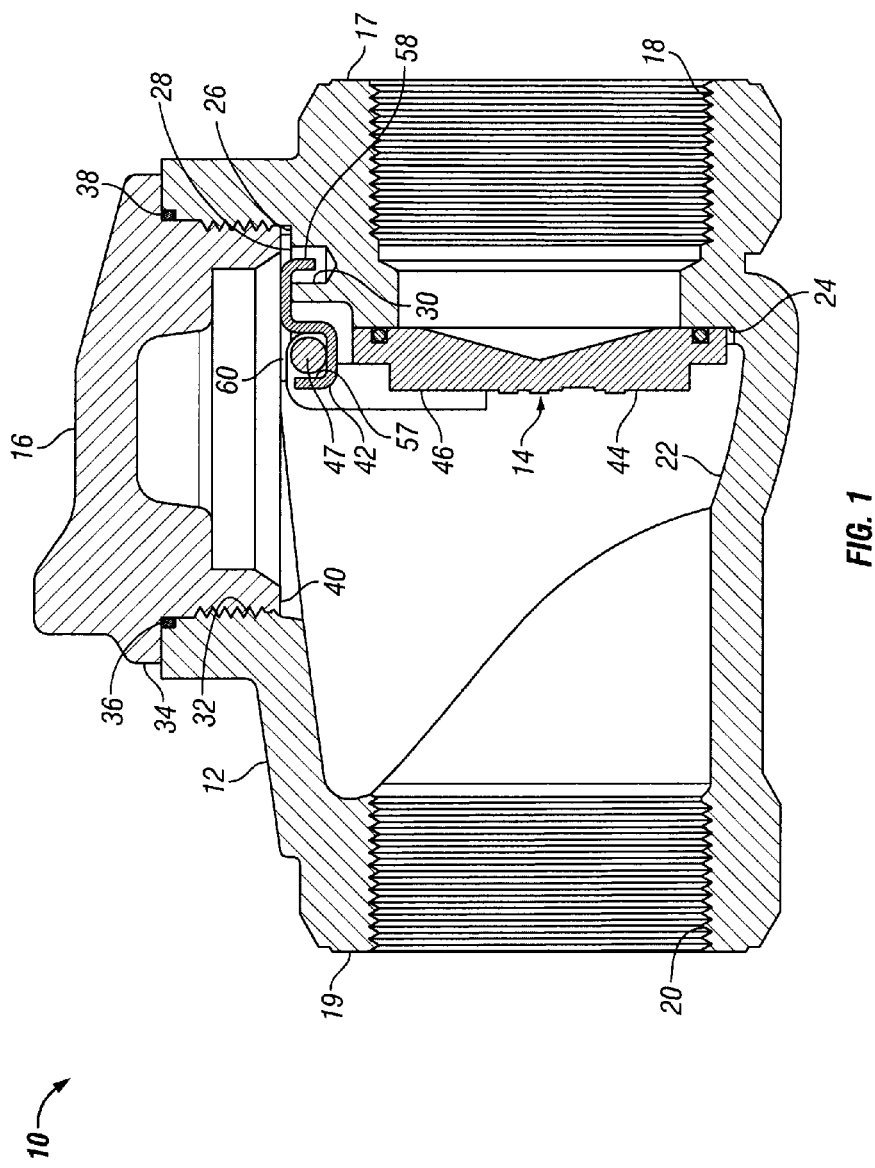
FIG. 1 is a sectional view of a check valve constructed in accordance with the present invention.
Figure 2:
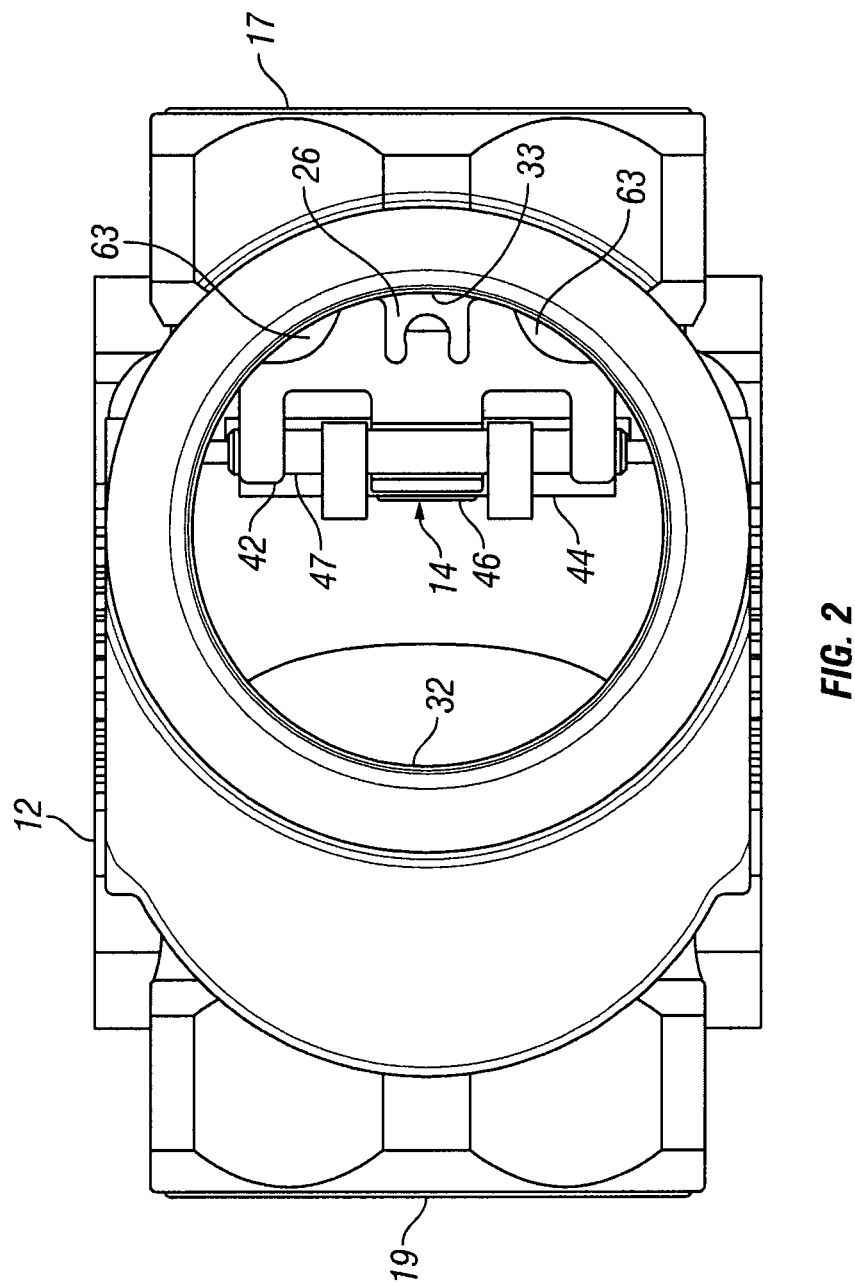
FIG. 2 is a top plan view of the check valve of FIG. 1 illustrated with a closure member removed.

Referring now to the drawings, and more particularly to FIGS. 1 and 2, a valve 10 constructed in accordance with the present invention is shown. The valve 10 includes a valve body 12, a clapper assembly 14, and a closure member 16. The clapper assembly 14 cooperates with the valve body 12 to permit fluid flow in one direction while preventing fluid flow in the opposite direction. As such, the valve 10 is of the type commonly known as a "swinging check valve."

The valve body 12 has a first end 17 with an inlet port 18 and a second end 19 with an outlet port 20 which is generally opposing the inlet port 18. The inlet port 18 extends into the valve body 12 and opens into a valve chamber 22 formed in a medial portion of the valve body 12. An annular valve seat 24 is defined about the inlet port 18. The valve seat 24 is shown to be formed as an integral part of the valve body 12. However, it will be appreciated that the valve seat 24 may be formed on a module that is inserted into the valve body 12. The outlet port 20 extends into the valve body 12 and opens into the valve chamber 22 generally opposite the inlet port 18. The inlet port 18 and outlet port 20 are shown to be internally threaded to provide a means for connecting the valve 10 into a conduit utilized for transporting a fluid. However, it will be appreciated that the inlet port 18 and the outlet port 20 may be adapted to be interposed in a flow line in other ways, such as be formed with flanges.

The first end 17 of the valve body 12 includes a shelf portion 26 which extends into the valve chamber 22 and defines a portion of the inlet port 18. The shelf portion 26 includes a generally flat bearing surface 28 for supporting the clapper assembly 14 in a manner to be discussed below. A pin receiving hole 30 is formed through the bearing surface 28 and into the shelf portion 26 along a center line of the valve body 12.

The upper portion of the valve body 12 is provided with an access port 32 which is in communication with the valve chamber 22. The access port 32 is threaded and sized to allow passage of the clapper assembly 14 to and from the valve chamber 22 via the access port 32. The shelf portion 26 of the valve body 12 projects into alignment with the access port 32 such that the bearing surface 28 faces the access port 32 and thus is accessible via the access port 32. Furthermore, because the shelf portion 26 intersects a portion of the valve body 12 that defines the access port 32, the shelf portion 26 has an arc shaped edge 33.

The closure member 16 functions to seal the access port 32 and thus has external threads to mate with threads of the access port 32. The closure member 16 further has a flange 34 for compressing a seal member 36, such as an elastomeric O-ring, disposed in a groove 38 of the valve body 12. The seal member 36 is compressed to effect a fluid tight seal between the closure member 16 and the valve body 12 when the closure member 16 is threaded onto the valve body 12 with the flange 34 engaging the valve body 12.

The closure member 16 further includes an abutment surface 40 defined by a lower end of the closure member 16. The abutment surface 40 serves to engage a portion of the clapper assembly 14 and thus cooperate with the valve body 12 to fix the clapper assembly 14 within the valve chamber 22. The size and position of the abutment surface 40 may varied so long as the abutment surface 40 engages the clapper assembly 14 when the closure member 16 is operably secured to the valve body 12 to affect a fluid tight seal. However, the abutment surface 40 is preferably annular in so far as the abutment surface 40 may slidingly contact the clapper assembly 14 as the closure member 16 is being secured to the valve body 12.

Referring now to FIGS. 1-4, the clapper assembly 14 includes a hanger 42 and a clapper 44 pivotally mounted to the hanger 42. The hanger 42 is adapted to be firmly held between the bearing surface 28 of the valve body 12 and the abutment surface 40 of the closure member 16 and thereby support the clapper 44 in alignment with the inlet port 18. The clapper 44 includes a valve disc 46 and a hinge pin 47.

With reference to FIGS. 3A, 3B, and 4, the hanger 42 includes a plate member 48 stamped from a sheet of metal. The plate member 48 has a front end 49, a rear end 50, a first side 51, a second side 52, an upper side 53, and a lower side 54. The plate member 48 is further characterized as having a body portion 55 and a pair of wings 56 extending laterally from the body portion 55. The body portion 55 is contoured to define a hinge pin receiving groove 57 traversing the body portion 55. The body portion 55 is formed to have an alignment tab 58 extending downward away from the lower side 54 and positioned to be received in the tab receiving hole 30 of the valve body 12 so that the clapper assembly 14 may be supported within the valve chamber 22 with the clapper 44 aligned with the inlet port 18 prior to the closure member 16 being secured to the valve body 12.

Each of the wings 56 has a proximal portion 59 and a distal portion 60. The distal portion 60 of each of the wings 56 is positioned laterally relative to the hinge pin receiving groove 57 and initially angled upwardly, as best shown in FIG. 4, so as to permit the hinge pin 47 of the clapper 44 to be inserted into the hinge pin receiving groove 57. The distal portion 60 of the wings 56 is thereafter engaged by the abutment surface 40 of closure member 16 in such a way that the distal portions 60 cooperate with the hinge pin receiving groove 57 to hold the hinge pin 47 in the hinge pin receiving groove 57.

The proximal portions 59 of the wings 56 each have a forward edge 61 which is contoured to substantially correspond to the contour of the access port 32. The proximal portion 59 of each of the wings 56 has at least one dimple 62 formed in one side so as to form a corresponding compressible protuberance 63 on the opposing side. In one embodiment, the dimples 62 of the plate member 48 are formed on the lower side 54 so that the protuberances 63 extend from the upper side 53. The protuberances 63 are formed on the wings 56 so that the protuberances 63 are tangentially positioned relative to the abutment surface 40 of the closure member 16 to facilitate sliding engagement between the abutment surface 40 of the closure member 16 and the protuberances 63 as the closure member 16 is being threadingly connected to the valve body 12. In the embodiment illustrated herein, the protuberances 63 are formed at or near the forward edge 61.

The protuberances 63 are formed in the plate member 48 in such a way that the plate member 48 is capable of being held firmly between the bearing surface 28 of the valve body 12 and the abutment surface 40 of the closure member 16 when the closure member 16 is secured to the valve body 12. The function of the compressible protuberances 63 is to cause the clapper assembly 14 to be held firmly in position between the valve chamber 22 and the closure member 16 while compensating for differences in dimension to the various components of the valve 10 due to normal manufacturing tolerances. For example, if a non-compressible body member were sized to be positioned alone between the closure member 16 and the valve body 12, in some instances the dimensions of the components of the valve 10 would result in the closure member 16 being properly sealed with the valve body 12 and the clapper assembly 14 being held in position without vibration or rubbing occurring between the clapper assembly 14 and the closure member 16 and/or the valve body 12. However, in other instances when the dimensions of the components of the valve cause the distance between the bearing surface 28 of the valve body 12 and the abutment surface 40 of the closure member 16 to be decreased, the plate member would interfere with the closure member 16 being properly sealed to the valve body 12, thereby increasing the risk that the valve 10 would leak. On the other hand, if the dimensions of the components of the valve are such that the distance between the bearing surface 28 of the valve body 12 and the abutment surface 40 of the closure member 16 are increased, the height of the body member would be less than the distance from the bearing surface 28 to the abutment surface 40. As such, the closure member 16 would not engage the plate member 48 before the closure member 16 is secured to the valve body 12. Consequently, the combined action of corrosion and the erosion created by vibration and the rubbing movement of the body member against the valve body 12 and the closure member 16 would rapidly cause a loss of surrounding metal which may result in failure of the valve 10 due to misalignment of the clapper 44.

The hanger 42 is fabricated of a corrosion resistant material, such as stainless steel. In one embodiment, the protuberances 63 are resilient whereby the protuberances 63 are capable of recovering their shape after being deformed by the application of force caused by securing the closure member 16 to the valve body 12. However, it should be appreciated that the plate member 48 may be formed of a material that becomes permanently deformed upon the protuberances 63 being compressed by the application of force so long as the protuberances 63 maintain sufficient tension against the abutment surface 40 so that the hanger 42 is held firmly between the closure member 16 and the valve body 12. It will also be appreciated that while the protuberances 63 have been described and illustrated as being engaged with the closure member 16, the protuberances 63 may alternatively be formed on the plate member 48 so that the protuberances 63 extend from the lower surface 54 and thus contact the valve body 12.

Referring now to FIGS. 5 and 6, the valve disc 46 is pivotally secured to the hanger 42 with the hinge pin 47 and cooperates with the valve seat 24 to provide alternate open and closed positions for the valve 10. The valve disc 46 is a substantially circular disc member adapted to engage the valve seat 24 in the closed position of the valve 10. A suitable sealing member, such as an O-ring 64, is disposed in an annular groove 66 for engaging the valve seat 24 to preclude leakage of fluid in the closed position of the valve 10. Alternatively, the sealing member may be disposed in the valve seat 24 instead of on the valve disc 46.

A pair of arms 68 extends from the valve disc 46 in a spaced apart, parallel relationship. The arms 68 are spaced a sufficient distance to receive the body portion 55 of the plate member 48 therebetween. The distal end of the arms 68 is connected to the hinge pin 47. The hinge pin 47 is shown to be formed as a single piece with the valve disc 62 and the arms 68. However, it will be appreciated that the hinge pin 47 may be secured within bores formed in the arms 68 in any suitable manner, such as securing a fastener on the ends, forming a head on the ends of the hinge pin 47 by enlarging or flattening the ends of the hinge pin 47, or providing the hinge pin 47 with a length where the ends of the hinge pin 47 are positioned near the interior surface of the valve body 12. In one embodiment, the distal end of the hinge pin 47 is offset relative to the center of gravity of the valve disc 46. As such, the pivot axis of the clapper assembly 14 is offset from the center of gravity of the valve disc 46, thus causing the valve disc 46 to be constantly urged in a direction toward the valve seat 24 in a normally closed position.

FIG. 1 illustrates the hinge pin receiving groove 57 of the hanger 42 as being oversized relative to the hinge pin 47 whereby the hinge pin 47 is able to move laterally within the hinge pin receiving groove 57 to permit an amount of free play between the hinge pin 47 and the hanger 42. Such free play allows the clapper 44 to properly align with the valve seat 24 upon the clapper 44 moving to the closed position, thereby compensating for any potential misalignment of the clapper 44 with the valve seat 24 due to wear or manufacturing tolerances. The free play between the hinge pine 47 and the hanger 42 further permits the clapper 44 to move linearly along an axis of the inlet port 18 in response to variances in line pressure. More specifically, the free play between the hinge pin 47 and the hanger 42 permits the clapper 44 to move along the axis of the inlet port 18 whereby a uniform pressure is maintained on the seal member 64 in a low pressure condition and a high pressure condition.

The above described construction of the valve 10 permits rapid repair of the valve 10 without requiring the valve body 12 being removed from the flow line. In particular, access to the clapper assembly 14 is obtained by unscrewing the closure member 16 from the valve body 12. With the closure member 16 removed from the valve body 12, the clapper assembly 14 can be grasped and withdrawn from the valve body 12 via the access port 32. To facilitate removal of the clapper assembly 14, the hanger 42 may be provided with a gripping member (not shown). A new clapper assembly 14 may then be inserted into the valve body 12 by inserting the alignment tab 54 in the tab receiving hole 30. The closure member 16 is then threaded onto the valve body 12 so that the abutment surface 40 of the closure member 16 engages and compresses the compressible areas of the hanger 42 and forces the plate member 48 firmly against bearing surface 28 of the valve body 12.

Where fluid pressure is applied at the inlet port 18, such pressure bears against the valve disc 46 of the clapper 44 to force the clapper 44 out of engagement with the valve seat 24 to provide a flow passage through the valve chamber 22 from the inlet port 18 to the outlet port 20 so that fluid will flow through the valve 10. When fluid pressure is applied at the outlet port 20, the weight of the clapper 44 cause the clapper 44 to pivot to the closed position wherein the valve disc 46 engages the valve seat 24 to occlude the passage of fluid through the valve 10.

Referring now to FIG. 7, another embodiment of a clapper assembly 14a is illustrated. The clapper assembly 14a is similar to the clapper assembly 14 described above, but the clapper assembly 14a is provided with a return spring 82 to further facilitate rapid closure of the clapper 44b by biasing the clapper 44b in the closed position. The return spring 82 also reduces slamming of the clapper 44b caused by pressure reversal. In one embodiment, the return spring 82 has two opposing ends 84a and 84b bent to hook or latch to the arms 68, a pair of looped spring sections 86 positioned about the hinge pin 47, and a medial portion 88 shaped to extend across a portion of the hanger 42.

From the above description, it is clear that the present invention is well adapted to carry out the objects and to attain the advantages mentioned herein as well as those inherent in the invention. While exemplary embodiments of the invention have been described for purposes of this disclosure, it will be understood that numerous changes may be made which will readily suggest themselves to those skilled in the art and which are accomplished within the spirit of the invention disclosed and as defined in the appended claims.

What is claimed is:

1. A valve, comprising:
    a valve body having an inlet port, an outlet port, a flow passage extending between the inlet port and the outlet port, and an access port;
    a valve seat defined about the inlet port of the valve body;
    a compressible hanger engaging a portion of the valve body and positioned in alignment with the access port of the valve body, the compressible hanger comprising a plate member stamped from a sheet of metal, the plate member having a front end, a rear end, a first side, a second side, an upper end, and a lower end, the plate member having a body portion and a pair of wings extending laterally from the body portion, the body portion contoured to define a hinge pin receiving groove traversing the body portion, each of the wings having a proximal portion and a distal portion, the proximal portion of each wing having at least one dimple formed in one of the upper side and the lower side and a corresponding protuberance formed on an opposing side so as to define a compressible area;
    a clapper having a valve disc and a hinge pin, the hinge pin being disposed in the hinge pin receiving groove such that the valve disc is movable between a closed position wherein the valve disc engages the valve seat to occlude the passage of fluid through the fluid flow passage and an open position wherein the valve disc is moved away from the valve seat to permit passage of fluid through the fluid flow passage; and
    a closure member connected to the valve body to close the access port of the valve body, the closure member having an abutment surface engaging the compressible areas of the hanger so that the hanger is compressed between the closure member and the valve body.

2. The valve of claim 1 wherein the distal portion of each of the wings is positioned laterally relative to the hinge pin receiving groove and engaged by the abutment surface of closure member in such a way that the distal portions cooperate with the hinge pin receiving groove to hold the hinge pin in the hinge pin receiving groove.

3. The valve of claim 1 wherein the proximal portions of the wings each have a forward edge contoured to substantially correspond to the contour of the access port.

4. The valve of claim 1 wherein the closure member is threadingly connected to the valve member, and wherein the protuberances extend from the upper side of the plate member toward the closure member to facilitate sliding engagement between the abutment surface of the closure member and the compressible areas of the plate member as the closure member is being threadingly connected to the valve body.

5. The valve of claim 1 wherein the closure member is threadingly connected to the valve member, wherein the proximal portions of the wings each have a forward edge contoured to substantially conform to a portion of the valve body and wherein the protuberances are tangentially positioned relative to the abutment surface of the closure member to facilitate sliding engagement between the abutment surface of the closure member and the compressible areas as the closure member is being threadingly connected to the valve body.

6. The valve of claim 1 wherein the body portion of the hanger has an alignment tab extending downward away from the lower side and wherein the valve body is provided with a tab receiving hole for receiving the alignment tab of the hanger to support the hanger on the valve body prior to the closure member being connected to the valve body.

7. The valve of claim 1 wherein the clapper is movable along a longitudinal axis of the inlet port.

8. The valve of claim 1 wherein the clapper further comprises means for biasing the clapper in the closed position.

9. A clapper assembly for a check valve, comprising:
    a compressible hanger comprising a plate member stamped from a sheet of metal, the plate member having a front end, a rear end, a first side, a second side, an upper end, and a lower end, the plate member having a body portion and a pair of wings extending laterally from the body portion, the body portion contoured to define a hinge pin receiving groove traversing the body portion, each of the wings having a proximal portion and a distal portion, the proximal portion of each wing having at least one dimple formed in one of the upper side and the lower side and a corresponding protuberance formed on an opposing side so as to define a compressible area; and a clapper having a valve disc and a hinge pin, the hinge pin being disposed in the hinge pin receiving groove such that the valve disc is movable relative to the hanger.

10. The clapper assembly of claim 9 wherein the distal portion of each of the wings is positioned laterally relative to the hinge pin receiving groove to cooperate with the hinge pin receiving groove to hold the hinge pin in the hinge pin receiving groove.

11. The clapper assembly of claim 9 wherein the proximal portions of the wings each have an arc shaped forward edge.

12. The clapper assembly of claim 9 wherein the protuberances extend upwardly from the upper side of the plate member.

13. The clapper assembly of claim 9 wherein the proximal portions of the wings each have an arc shaped forward edge and wherein the protuberances are positioned on the forward edge of the wings.

14. The clapper assembly of claim 9 wherein the body portion of the hanger has an alignment tab extending downward away from the lower side.

15. The clapper assembly of claim 9 wherein the clapper further comprises means for biasing the clapper in a closed position.

* * * * *